(12) United States Patent
Takeshima et al.

(10) Patent No.: US 7,219,134 B2
(45) Date of Patent: May 15, 2007

(54) NETWORK SYSTEM

(75) Inventors: Yoshiteru Takeshima, Yokohama (JP); Masahiko Nakahara, Machida (JP)

(73) Assignee: Hitachi, Ltd., Tokyo (JP)

( * ) Notice: Subject to any disclaimer, the term of this patent is extended or adjusted under 35 U.S.C. 154(b) by 831 days.

(21) Appl. No.: 10/360,356

(22) Filed: Feb. 10, 2003

(65) Prior Publication Data
US 2004/0054779 A1    Mar. 18, 2004

(30) Foreign Application Priority Data
Sep. 13, 2002    (JP) .............................. 2002-267551

(51) Int. Cl.
*G06F 15/16*    (2006.01)
*G06F 15/173*    (2006.01)
(52) U.S. Cl. ...................... 709/217; 709/218; 709/219; 709/223; 709/226
(58) Field of Classification Search ............. 455/456.3; 705/10, 71; 709/217–219, 223, 226; 713/165
See application file for complete search history.

(56) References Cited

U.S. PATENT DOCUMENTS

2001/0051996 A1 * 12/2001 Cooper et al. .............. 709/217
2002/0120577 A1 *  8/2002 Hans et al. .................... 705/59
2002/0128984 A1 *  9/2002 Mehta et al. .................. 705/71

FOREIGN PATENT DOCUMENTS

| EP | 1132799 | 9/2001 |
|---|---|---|
| JP | 2000285061 | 10/2000 |
| JP | 2002135239 | 5/2002 |
| WO | 0064122 | 10/2000 |

OTHER PUBLICATIONS

Internet Content Adaptation Protocol (ICAP), Network Appliance, Version 1.01, Jul. 30, 2001, pp. 1-13.
G. Tomlinson, et al "Extensible Proxy Services Framework", Network Working Group, Internet-Draft, Jan. 11, 2001, pp. 1-44.
"The Beginning of a New Era", Newsonink, XP-002215192, pp. 1-4.
C. Fielding "Hypertext Transfer Protocol", Network Working Group, 1999, pp. 1-176.
"Signature Server, The Beginning of a New Era", NEWSONINK, www.cryptomatic.com, Jan. 2001, pp. 1-4.

* cited by examiner

*Primary Examiner*—Ario Etienne
*Assistant Examiner*—Hussein El-chanti
(74) *Attorney, Agent, or Firm*—Mattingly, Stanger, Malur & Brundidge, P.C.

(57) ABSTRACT

A network system having a client, a content server, application servers and a proxy server is described. The proxy server relays content and data between the client, the content server and the application servers upon a request for content from the client. The application servers process the requested content in accordance with pre-established signature and content verification requirements before the content is relayed to the client. The applications servers also provide signature and content verification management for the network.

2 Claims, 16 Drawing Sheets

FIG. 5

REGISTERED CONTENT DATABASE (45)

| CONTENT ID (451) | STATUS (452) | EXPIRY DATE (453) | URL (454) | REGISTRANT INFORMATION (455) | WHEN IT WAS INVALIDATED (456) | SECURITY LEVEL (457) |
|---|---|---|---|---|---|---|
| XXXXX1 | VALID | 2003/1/1 | http://URL1 | USER 1 | — | 2 |
| XXXXX2 | VALID | 2003/2/1 | http://URL2 | USER 2 | — | 3 |
| XXXXX3 | INVALID | 2003/3/1 | http://URL3 | USER 3 | January 1, 2003 | 3 |

| SECURITY LEVEL | FUNCTION 1 | ... | FUNCTION n | CLASS LIBRARY 1 | ... | CLASS LIBRARY n |
|---|---|---|---|---|---|---|
| 1 | × | ... | ... | × | ... | ... |
| 2 | ○ | ... | ... | × | ... | ... |
| 2 | × | ... | ... | ○ | ... | ... |
| ... | ... | ... | ... | ... | ... | ... |
| n | ... | ... | ... | ... | ... | ... |

NETWORK SYSTEM

INCORPORATION BY REFERENCE

This application claims priority based on a Japanese patent application, No. 2002-267551 filed on Sep. 13, 2002, the entire contents of which are incorporated herein by reference.

BACKGROUND OF THE INVENTION

In a network system wherein content existing on a server can be accessed from clients connected to the server through communication lines, the present invention relates to a proxy server that relays data to be communicated between the server and the clients, and a system using the proxy server.

It has been come into popular use for end users to download computer-executable programs and files of music and moving pictures, using a protocol called Hypertext Transfer Protocol (HTTP), and run programs or play music and moving pictures on the end users' personal computers. In this way of getting programs and information files over a network, it is an important problem to assure providing user terminals with security. It is possible that, for example, a malicious third party invades a Web server on the Internet and alters data of content (for example, a moving picture file or computer-executable program) existing on the server to program data polluted with a computer virus. In that event, when a user downloads the program to the user's terminal unconsciously and run the program, trouble will happen that data stored on the terminal is corrupted or that the user personal important information that should be secret is transmitted over a network freely by the malicious third party. As countermeasures against such trouble, a virus detection program is used to detect and eliminate computer viruses. The countermeasures using the virus detection program may be taken in the following two manners.

One method is running the virus detection program on end user's terminals or a Web server. Another method is running the virus detection program on a proxy server or a fire wall, wherein content being downloaded to a user terminal is checked for viruses in real time. A Web proxy is a Web communications intermediary technology via which Web data is transmitted from a server to a client. Description of the Web proxy is provided in Sections 1.3 and 1.4, R. Fielding, et al. RFC 2616 "Hypertext Transfer Protocol— HTTP/1.1" June, 1999, The Internet Society, <URL:http://www/ietf.org/rfc/rfc2626.txt>. The latter method in which virus detection is performed on the network is suitable for communication carriers that provide Internet connection services in providing users with security services as well.

As an advanced version of the latter technology, a Web proxy verifies digital signatures, as described in PCT Gazette WO 00/64122. According to this art, tampered content is detected as follows. First, a digital signatures to all content items stored on a Web server are generated beforehand. When content is downloaded via the Web proxy, the Web proxy verifies that the content being downloaded is authorized, using its digital signature. The digital signatures are generated and stored in a storage of the Web proxy beforehand. If authorized content is verified, the content is sent as is to the user that requested the content. If tampered content is detected, the Web proxy returns an error message or sends its original content stored beforehand on it to the user.

In the former method, it is difficult to install the virus detection program on all user terminals connected to the network. If a mobile phone is used as such a terminal, it is impossible to run the virus detection program on it. Even if virus check is performed on the server, there is a possibility of the checked data being polluted with a virus when it is routed over the network.

In the latter method by which the Web proxy performs virus detection, because the proxy at which traffic on the network rushes must perform the task of virus detection that is a heavy processing load, the processing performance of the proxy itself becomes very low. Another approach has been proposed in which the virus detection program runs on another server connecting to the proxy and data is exchanged between the server and the proxy. Even for this approach, the processing performance of the server on which the virus detection program runs is also a bottleneck.

In the art disclosed in WO 00/64122, because the proxy does not perform the virus scan, its processing load is reduced. However, increase in its processing load for decrypting digital signatures is inevitable.

As described above, the approach that an intermediary device on the network, instead of the server, performs additional processing of content being downloaded from the server to a client involves the problem that its processing load becomes too heavy.

Another problem also exists. The sequence of downloading a plurality of contents cannot be checked by prior art, even though such check would be desirable. For example, when a content and its metadata are downloaded, it cannot be checked whether the content is downloaded after the metadata is downloaded.

SUMMARY OF THE INVENTION

The present invention is characterized in that an intermediary communication device (referred to as a proxy server) provided between a client and a server comprises a unit that relays communication data which relays data to be communicated between the client and the server and a unit that calls out application server which encapsulates content received via the unit that relays communication data from the server into a predetermined format message, forwards the message to an application server, and receives the content and data returned as the result of additional processing performed by the application server. Consequently, the intermediary device on the network, instead of the server, is competent to instruct application servers to perform additional processing of content being downloaded to the client.

The proxy server includes a transfer control database in which conditions by which content is forwarded to one of the application servers and information about the application servers, required for forwarding the content, are set and stored. The unit that relays communication data parses an access request and information described for content to be accessed and the content is forwarded to an appropriate application server if the access request and the content-associated information satisfy the conditions stored in the transfer control database.

The unit that calls out application server parses the result returned from the application server and the content sent back from the server, the data returned from the application server, the content that has been cached on the proxy server previously, or an error message is sent back to the client. Thus, an appropriate response can be sent back to the client and data traffic between the application server and the proxy server can be reduced. Additional processing of content can be performed without reconfiguring the client and server.

The unit that relays communication data may cache content which may be verified content data received from the appropriate application server or content retrieved, according to its URL, via the network. When a particular content item subjected to additional processing provided by an application server should be sent back to a client as a quick response, the application server can instruct the proxy server to cache the content prior to client request for access to the content.

The network system of the present invention includes application servers; for example, a content registration server which registers content accepted from a content creator or provider (referred to as a content manager, also) by the registrant's application into a database, wherein the data of the content is checked by virus detection or the like and a digital signature (hereinafter referred to as, simply, a signature) is attached to the content before registering the content, a content verification server which checks the data of content to be registered by the registrant's application by virus detection or the like, and a signature verification server for verifying signatures.

According the present invention, the server stores signed content and the proxy server forwards the signed content being downloaded by client's request to the signature verification server. The signature verification server verifies the validity of the signature attached to the content and returns the result of verification to the proxy server. If the result of verification is valid, the proxy server sends back the content to the client. If the result is invalid, the proxy server returns an error to the client. The content data is verified beforehand and, when the content is downloaded, it can be ensured that the content data is valid by verifying only the signature attached to the content. Consequently, verified content can more quickly be distributed to clients.

For signature issuance and verification, private key and public key certificates stored on appropriate servers in the network system are used.

Specifically, the proxy server which relays signed content transmitted from the server to a client forwards the signed content to the signature verification server as one of the above-mentioned application servers. Signature verification prevents the content data from being tampered as it is routed over the network without requiring user terminals to run a content verification program. Security is assured while high throughput of the network is maintained.

The content registration server is provided with a function to make the proxy server cache verified content when registering content. This enables quicker sending back of secured content to a client in response to client request for access to a registered content item.

The content verification server includes a table for management of a plurality of security levels so that content verification by a security level that was set, based on a contract or the like can be performed.

Having received signed content, the signature verification server determines whether the content should be sent back to the client and returns the result of the determination to the above-mentioned proxy server. Specifically, the signature verification server performs a tampering check of content, which is achieved by verifying the signature of the content, and searches the database for the content ID specified in the signature and checks whether the content data is valid.

The task of signature verification is separated from the proxy server and assigned to another server, that is, the proxy server at which traffic rushes is made free from the heavy load of the signature verification task. Thus, the processing speed of the proxy server can be enhanced. Maintenance and operation would become easier because reconfiguration can be performed simply by signature verification server replacement and altering the transmission setting on the proxy server and it is not necessary to add a new software function or alter software for signature verification processing or stop the proxy server operation.

The database managed by signature verification servers always synchronize with the database of content registration servers. Thus, management can be performed such that content registration information is shared by the application servers within the network system of the present invention and its inconsistency does not occur.

A method for content verification of the present invention enables verifying whether a couple of content items are downloaded properly to a client by registering a plurality of content items in a couple on the content registration server. Specifically, the signature of a second content item is included in a first content item. When verifying the first content item, the signature verification server stores the signature of the second content item included in the first content item. When verifying the second content item, the signature verification server performs verification, using the stored signature of the second content item. Thus, it can be verified that the first and second content items are downloaded as those registered in a couple. Control is possible such that the couple of content items should be judged valid only when one content item is downloaded after the other content is downloaded.

In the present invention, content means digital data such as text files, multimedia data (for example, music files and moving picture files), or computer-executable programs.

According to the present invention, a high-speed or high-functionality content verification system can be realized without the need to reconfigure the clients and server.

These and other benefits are described throughout the present specification. A further understanding of the nature and advantage of the invention may be realized by reference to the remaining portions of the specification and attached drawings.

BRIEF DESCRIPTION OF THE DRAWINGS

FIG. 5 illustrates an example of registration database 45 structure.

FIG. 8 illustrates an example of a security management table provided in a content verification system 60.

DESCRIPTION OF THE PREFERRED EMBODIMENTS

Figure 14:
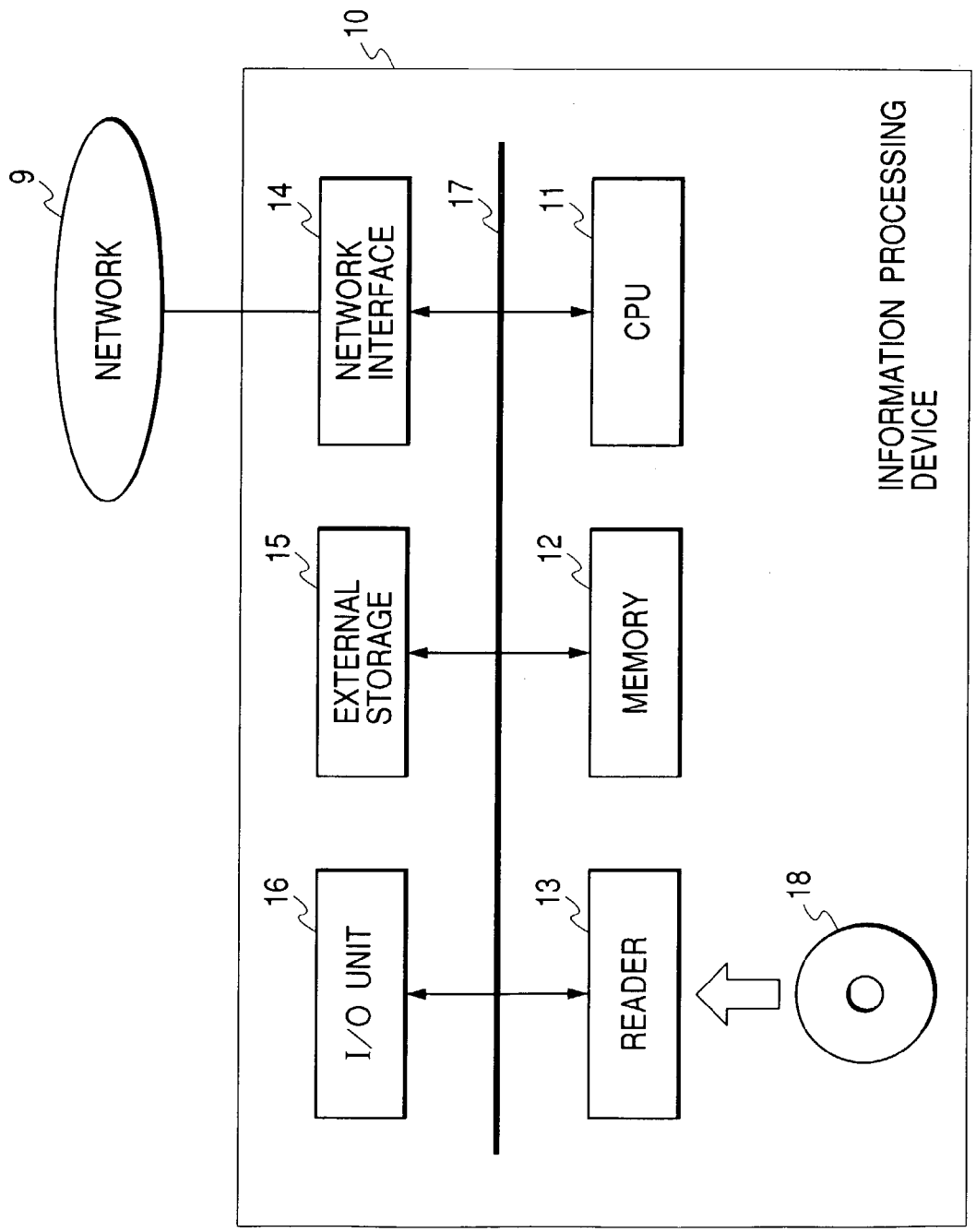
FIG. 14 is a diagram representing a configuration of an information processing device; all devices employed in the present invention can be embodied in this configuration.

All devices involved in illustrative embodiments of the present invention can be constituted as a general computer system, for example, as is shown in FIG. 14. A device is comprised of a CPU 11, a memory 12, a reader 13 which reads data from a removable and portable storage medium 18 such as a CD-ROM, DVD-ROM, etc., a network interface 14 for communicating with a corresponding node via a network 9, external storage 15 such as a HDD, and an I/O unit 16 comprising a keyboard, mouse, and display. On each device, a computer program created to implement specific tasks is loaded into the memory 12 beforehand and the CPU 11 executes the computer program.

The computer program may be stored into the external storage 15 beforehand or imported from another device via a removable storage medium or a communication medium.

Using the accompanying drawings, a first preferred embodiment of the present invention will be described below.

Figure 1:
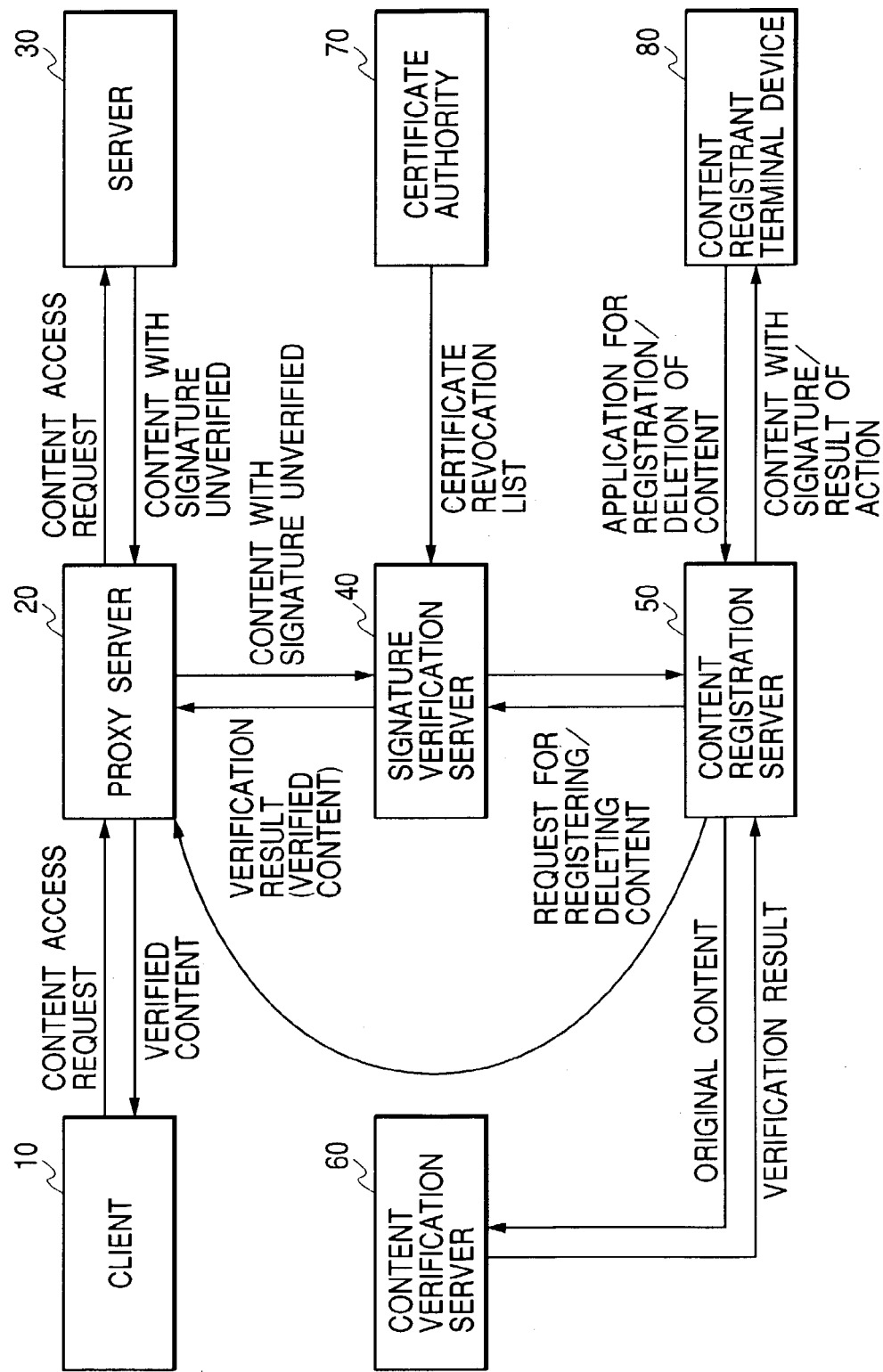
FIG. 1 is a diagram representing how a network system which enables content verification is built logically.

FIG. 1 is a simplified diagram representing how a network system is built in accordance with the first preferred embodiment of the invention.

In the first preferred embodiment, the network system is comprised of a client 10, a server 30, a proxy server 20 which relays data to be communicated between the client 10 and the server 30, a signature verification server 40 which verifies whether content should be sent to the client 10, using the signature attached to the content, a content registration server 50 which accepts content beforehand from the content manager such as the content creator or possessor, and generates a signature attached to the content, a content verification server 60 which checks the data of content received by the content registration server 50, an certificate authority 70 which distributes a certificate revocation list containing revoked ones of public key certificates to be used when the signature verification server 40 verifies the signature, and a content registrant terminal 80 through which the content manager registers content with the content registration server 50. All the above-mentioned devices are interconnected via a network 9.

The client 10 and the server 30 are connected via at least one proxy servers 20. The proxy server 20 connects to the signature verification server 40 and the signature verification server 40 connects to the content registration server 50 and the certificate authority 70. The content registration server 50 connects to the content verification server 60 and the content registrant terminal 80.

On the client 10 device, a existing Web client application such as a Web browser runs. When the client 10 user wants to download content such as text data, moving picture data, or program files, stored on the server 30, the client 10 sends the server 30 a message (access request) that requests the server 30 to send the content and receives the content.

When the server 30 on which a Web server program runs receives the access request from the client 10, it sends the requested content to the client 10. In the present preferred embodiment, the server 30 stores signed content 31 which is illustrated in FIG. 9 in its storage.

Signed content 31 is prepared prior to access request from the client 10 as follows. Content supplied from the content registrant terminal 80 is registered on the content registration server 50; at this time, the content data is checked by the content verification server 60 and a signature is attached to the content so that the content is allowed to be downloaded to the client 10. Signatures in the present preferred embodiment are generated by public key encryption using a hash function.

Figure 9:
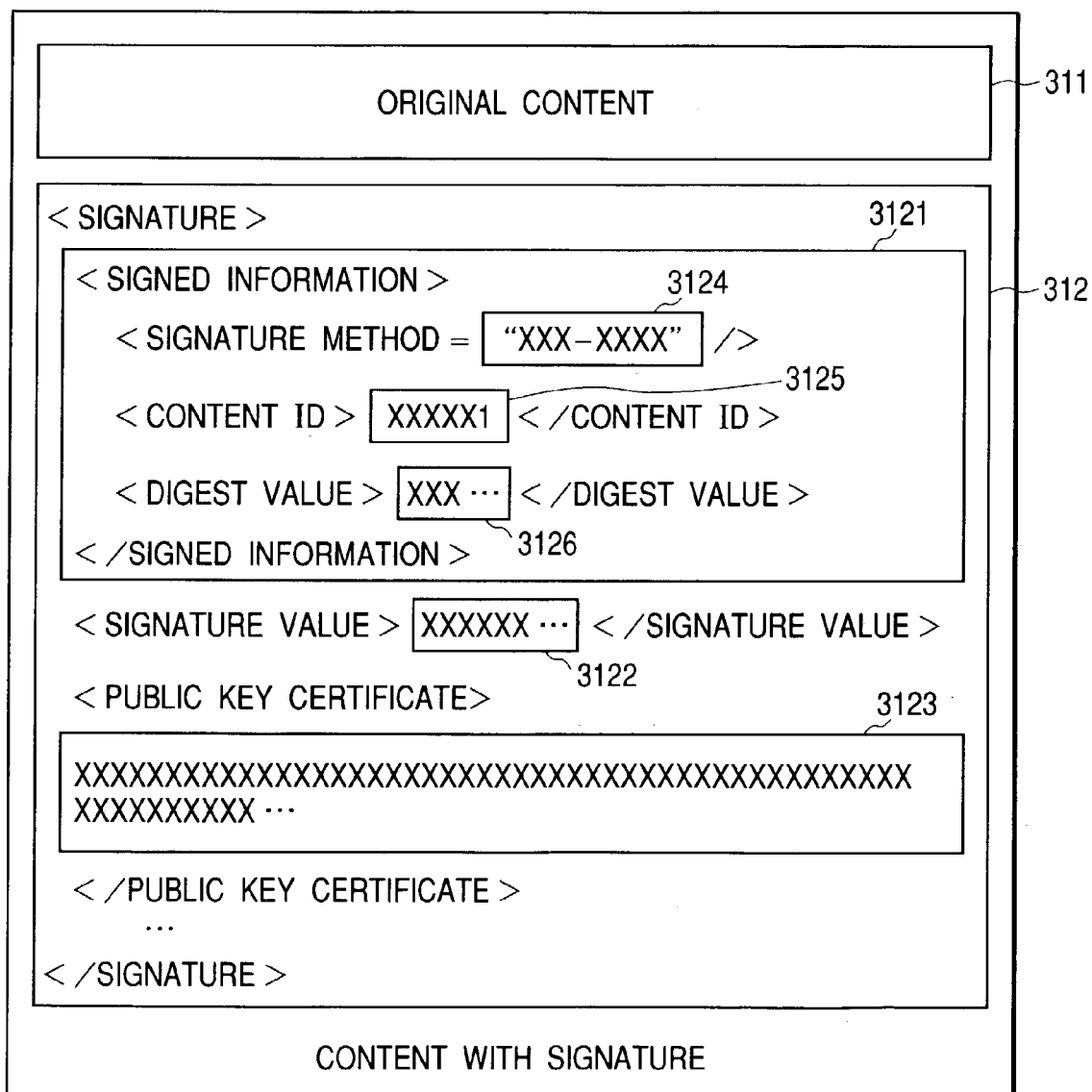
FIG. 9 illustrates an example of signed content 31 structure.

The signed content 31 illustrated in FIG. 9 comprises original content 311 which may be text, a moving picture, a computer-executable program, or the like and a signature 312 part which is used for verifying the validity of the original content 311. The signature 312 part comprises signature information 3121, a signature value 3122 obtained from encrypting the signature information 3121 with a private key, and a public key certificate 3123 including a public key required for decrypting the signature value 3122. The signature information 3121 comprises a signature method 3124 which indicates a hash function algorithm or the like, a content ID 3125 which is an ID uniquely assigned to the content by the present system, and a characteristic value (digest value) of the content 3126 calculated by making the hash function act on the content data.

The proxy server 20 in FIG. 1 is provided with a function of relaying an access request sent from the client 10 to the server 30 and content in response to the request (relay function). Destination server 30 information (such as a host name and IP address) is included in URL information on content described in the access request message.

The proxy server 20 is also provided with a cache function for caching content it relayed as a response.

Moreover, the proxy server 20 forwards signed content 31 as a response received from the server 30 to the signature verification server 40 with a request to verify its signature 312 if the content satisfies preset conditions (URL, extension, file type, etc. of the content). If the result of the verification returned has no problem, the proxy server sends the content to the client 10.

Communication between the proxy server 20 and the signature verification server 40 may be preferably performed, using a communication protocol such as, for example, HTTP or Internet Content Adaptation Protocol (iCAP).

When the signature verification server 40 receives the signed content 31 transmitted from the proxy server 20, it verifies the signature 312, ascertains that the content is not tampered, and returns the verification result to the proxy server 20.

The signature verification server 40 receives and stores beforehand a certificate revocation list containing revoked ones of public key certificates to be used when it verifies the signature 312, distributed from the certificate authority 70. When it receives signed content 31, it verifies the validity of the public key associated with the content by checking the public key certificate against the certificate revocation list.

Also, the signature verification server 40 stores information that proves the validity of content per content ID 3125 in a registration database 45.

The content registration server 50 performs signature issuance and content registration management.

Its signature issuance function is implemented as follows. The content registration server 50 accepts a content registration request from the content registrant terminal 80, receives the content, and sends the accepted content to the content verification server 60. When it receives the result of verification, it ascertains that the content data has no problem, generates a signature 312 to the content, attaches the signature 312 to the content, and returns the result to the content registrant terminal 80.

For example, when the content registration server 50 accepts a request for registering a computer-executable program file, it requests the content verification server 60 to check whether the program data includes computer viruses, whether a class library incorporated within the program to be referenced by the program may cause corruption of data stored on the client 10 terminal or unexpected transmission of the data to a third party, and other possibilities of danger. If the result of the verification is no problem, the content registration server 50 adds a signature 312 to the computer-executable program file.

The content registration management function is to generate a content ID that uniquely identifies accepted content throughout the system and manage content items, according to the validity of content per ID, using the database. This function comprises a function to add registration information for a new content item to the registration database when the content registrant registers content, a function to change the status information about a content item to "invalid" when the validity of the registered content item has lost, and a function to delete the information about an expired content item from the registration database. When a plurality of signature verification servers 40 and content registration servers 50 are provided for load sharing, one of the content registration servers 50 is further provided with a function to distribute registration information about a content item to other servers when the content registrant makes an application for registration of the content item with it and the registration is accepted.

This function prevents inconsistency of registered content items between or among the plurality of content registration servers 50 and can avoid an overhead which would otherwise occur whenever each signature verification server 40 queries the master content registration server 50 about registration information for a content item when verifying the signature 312 of the content item.

For example, assume that the content registrant registers content and, thereafter, makes an application for deregistering the content. The master content registration server 50 first accepts a request for registering content from the content registrant terminal 80 and one of the content verification server 60 checks the content data. Then, the master content registration server 50 assigns an ID to the content, registers the content as a new "valid" content item in the registration database, and sends the registration information about the new content item to the signature verification servers 40 and other content registration servers 50 so that the registration databases on the servers are updated.

When the master content registration server 50 receives an application for deregistering the above content from the content registrant terminal 80, it changes the status information for the content item to "invalid" if it is within the expiry date of the content or deletes the information about the content item from the registration database if the content is expired. Then, the master content registration server 50 instructs the signature verification servers 40 and other content registration servers 50 to make the same change or deletion so that the registration databases on the servers are updated.

If the client 10 requests access to a content item that has been deregistered, the request is handled as follows. After the signature verification server 40 verifies the validity of the signature 312 of the signed content 31 received from the proxy server 20, it checks the content ID within the signature 312. Using the content ID as a key, the signature verification server 40 searches its content registration database 45A and finds that the status of the content item is "invalid" or the content item has been deleted. The signature verification server 40 notifies the proxy server 20 that the content should not be sent to the client 10 as the verification result of the content item is invalid.

The content verification server 60 checks the content data received from the content registration server 50, checks whether the content should be sent to the client 10, and returns the result of verification to the content registration server 50. For example, the content verification server 60 analyzes the content for possibilities of danger; for example, to see whether the data includes viruses, or to see whether a class library incorporated within the program to be referenced by the program may cause corruption of data stored on the client 10 terminal or unexpected transmission of the data to a third party.

The certificate authority 70 distributes a certificate revocation list (CRL) to the signature verification server 40 periodically or at request of the signature verification server 40.

The content registrant terminal 80 is used for the content manager such as the content creator, possessor, or provider to register content with the content registration server 50 and is provided with a user interface function allowing the content manager to make an application for registering content and registrant information or deleting a content item and a communication function with the content registration server 50.

The content registrant terminal 80 may be a terminal on which a Web browser runs. The registrant as the user of the terminal starts the Web browser, accesses the content registration server 50, and enters necessary information such as registrant information and a file path (location on a disk) of the content to be registered, which has been stored on the content registrant terminal 80, into an entry form presented in the Web browser window as a response, and click a "register" button. Then, content registrant terminal 80 transmits an application for registering the content and electronic data of the content to the content registration server 50. Thereafter, as a response from the content registration server 50, the result of registration of the content is displayed on the screen and the signed content is downloaded.

When the registrant has made an application for deregistering a content item, the result of deregistration of the content is displayed on the screen. If the registration or deregistration is unsuccessful, an error message is returned. The singed content 31 as the response once received by the registrant is supplied to the server 30 and stored into the storage such as a hard disk on the server 30. For the method of supply, the signed content 31 can be transferred from the content registrant terminal 80 to the server 30 over a secure transmission path set up therebetween; alternatively, it is possible to store the signed content 31 on a storage medium such as a flexible disk and transport the disk to the server 30.

In the configuration shown in FIG. 1, the functions realized by a plurality of devices may be physically realized by a single device. For example, the functions of the signature verification server 40 may be incorporated into the proxy server 20. The functions realized by a single device may be physically realized by a plurality of devices. For example, the signature issuance and content registration management functions of the content registration server 50 may be realized by separate servers which communicate with each other via the network.

Using FIGS. 2 to 14, the first preferred embodiment of the invention will be further described.

Figure 2:
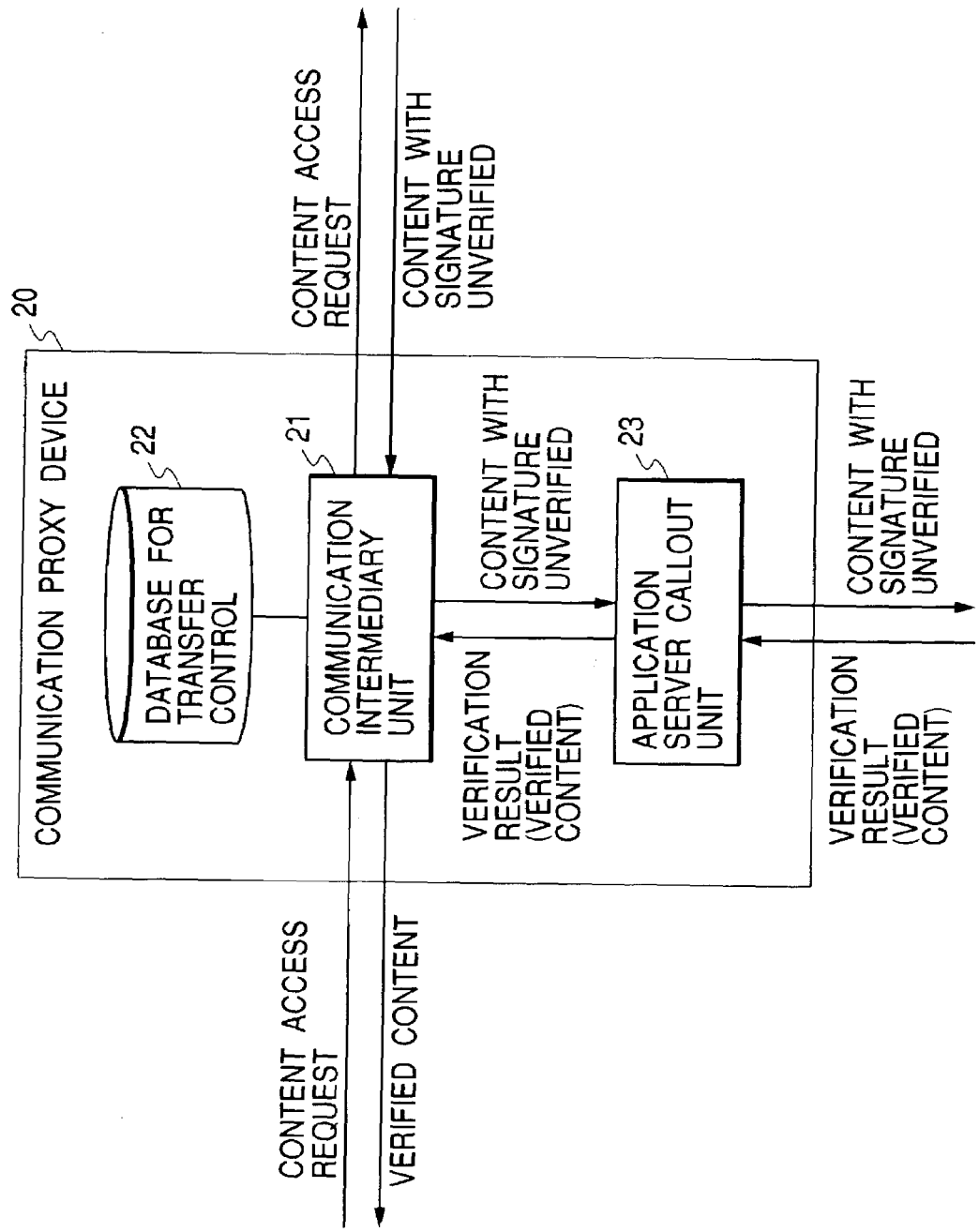
FIG. 2 is a diagram representing a functional configuration of a proxy server 20.

FIG. 2 is a diagram representing a configuration of the proxy server 20 in the present preferred embodiment.

The proxy server 20 in the present preferred embodiment is comprised of a unit that relays communication data 21 which relays data to be communicated, a transfer control database 22 in which conditions and information for forwarding communication data to the signature verification server 40 are stored, and a unit that calls out application server 23 for making connection to the signature verification server 40.

The unit that relays communication data 21 receives an access request transmitted from the client 10 and forwards it to the server 30 designated by the URL specified in the access request message. Also, this unit receives non-signed content sent back from the server 30 and forwards it to the client 10.

When the unit that relays communication data 21 receives signed content 31, it passes the signed content 31 which is unverified to the unit that calls out application server 23 in order to forward it to the signature verification server 40, based on the conditions and information stored in the transfer control database 22. Thereafter, when the unit that relays communication data receives a "verification successful" message as the result of verification or original content 311 as a response from the signature verification server 40, it sends back the original content 311 to the client 10. When the unit receives the signed content 31 as the response, it removes the signature 312 from the content and sends back the original content 311 or the signed content 31 as is to the client 10. Whether or not the signature 312 should be removed is determined by setting of the proxy server 20. If the unit receives a "verification unsuccessful" response message, it sends an error notification to the client 10. If the unit receives content other than the original content 311 as the response, it may send the received content as is to the client 10.

Figure 3:
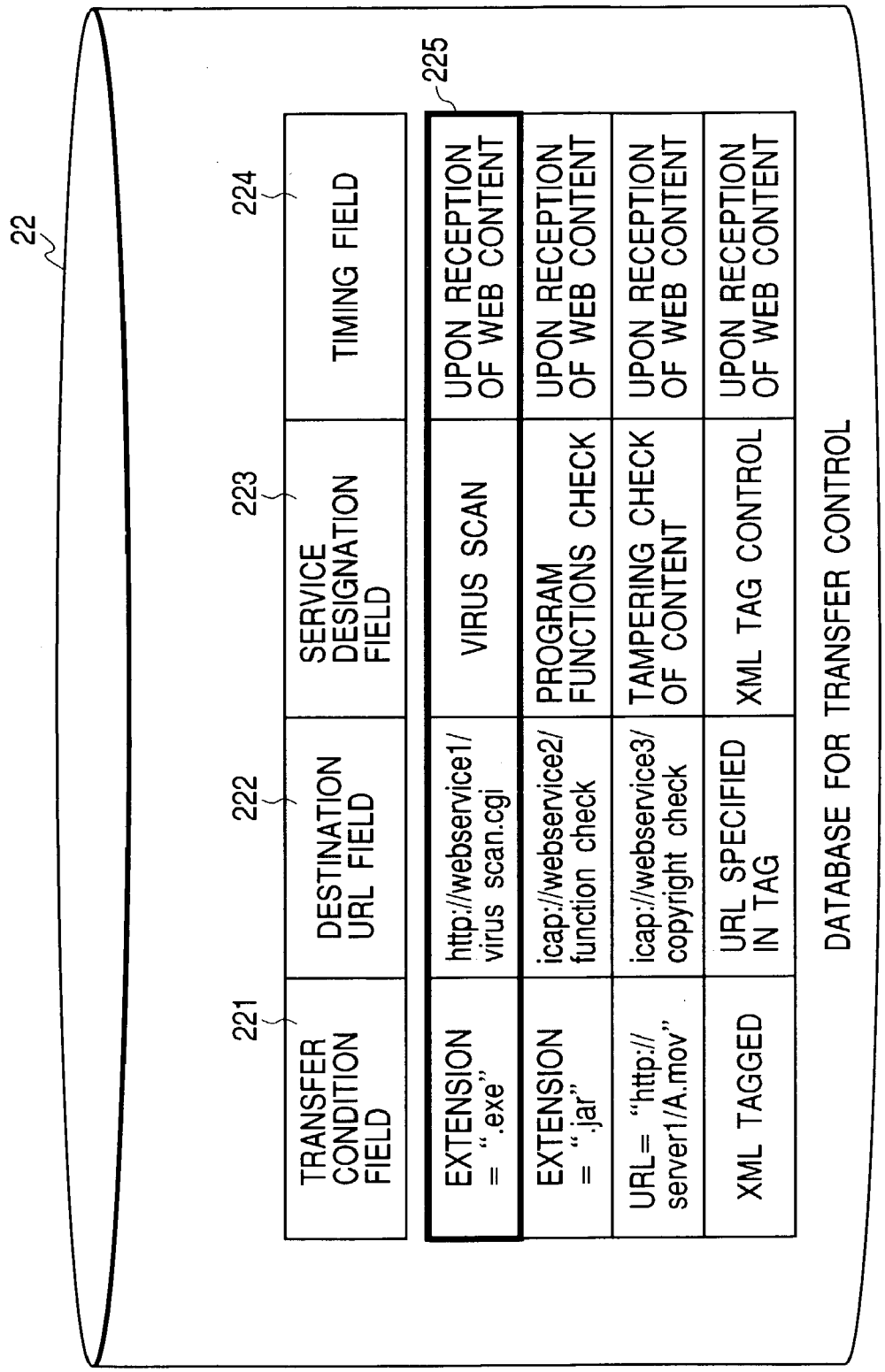
FIG. 3 illustrates an example of transfer control database 22 structure.

The transfer control database 22 is a table-form database wherein a transfer condition field 221 entry is used as a search key, as is illustrated in FIG. 3. This database is used for managing the conditions for forwarding signed content 31 to the signature verification server 40. The entries 225 of the transfer control database 22 are as follows. In the transfer condition field 221, a condition that triggers transmission of signed content 31 to the signature verification server 40 is stored. In the destination URL field 222, a destination URL of the signature verification server 40 to which the proxy server 20 transmits the signed content matched with the entry in the transfer condition field 221 is stored. In the service designation field 223, a service to be executed for the signed content matched with the entry in the transfer condition field 221 is stored. In the timing field 224, information as to when the proxy server 20 transmits the signed content 31 matched with the entry in the transfer condition field 221 to the signature verification server 40 is stored.

For example, on a row of the entries 225 marked out in FIG. 3, extension=".exe" exists in the transfer condition field 221 and, therefore, a content file with URL including extension ".exe" specified in the access request message received from the cline 10 matches this condition. For the matched content data to be communicated, a "virus scan" service must be executed. To do this, the signed content 31 is forwarded to the signature verification server 40 designated by URL "http://webservicel/virus_scan.cgi" "upon reception of content" from the server 30.

In some embodiment, the URL of a destination signature verification server 40 may be specified in the signature 312 attached to content and the signed content 31 received be forwarded to the signature verification server 40 designated by the URL described within the signature 312.

When the proxy server 20 is going to transmit signed content 31 to the signature verification server 40, the unit that calls out application server 23 in FIG. 2 establishes connection to the signature verification server 40 and creates a message 32 including the signed content 31. This message is constructed, for example, by appending URL 321 as the destination to access, which is specified in the access request message from the client 10 and stored on the proxy server 20, to the signed content 31 illustrated in FIG. 9. The use of the URL 312 as the destination to access makes it possible to check whether the signed content 31 is downloaded from the correct URL where it must be located when the signature verification server 40 verifies the signature 312.

Figure 4:
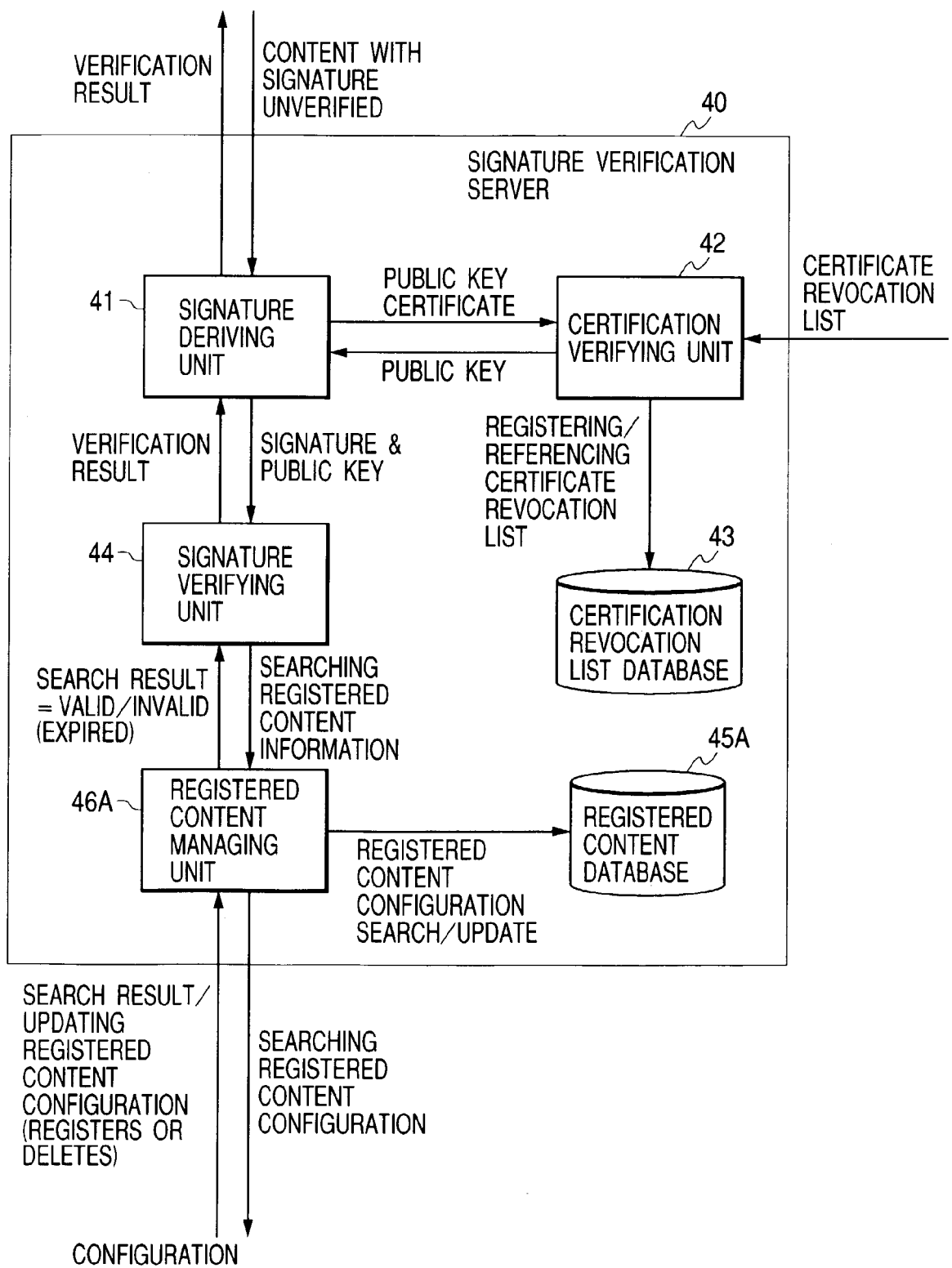
FIG. 4 is a diagram representing a functional configuration of a signature verification server 40.

FIG. 4 shows a configuration example of the signature verification server 40.

A unit that acquires signatures 41 parses the message 32 transmitted from the proxy server 20 and gets the signed content 31 which is unverified. Then, it takes out the signature 312 attached to the content 31, takes out the public key certificate 3123 which is required for verifying the validity of the signature 312 from the signature 312 of the content 31, and passes the public key certificate to a unit that verifies certificates 42.

As the result of verification, if the public key certificate 3123 is valid, the unit that verifies certificates 42 gives the public key to the unit that acquires signatures 41. The unit that acquires signatures 41 passes the signature 312 and pubic key to a unit that verifies signatures 44 from which it gets the result of verification of the signature 312. As the result of this verification, if it is ascertained that the content 31 is "valid," the unit that acquires signatures 41 returns a "verification successful" message to the proxy server 20. Together with this message, the unit may send the original content 311 or signed content 31 for which verification was successful to the proxy server 20.

If the unit that acquires signatures 41 receives a verification unsuccessful response from the unit that verifies certificates 42 because the public key certificate is invalid or if it is notified that the content 31 is "invalid" or "void" as the result of verification from the unit that verifies signatures 44, it notifies the proxy server 20 of verification unsuccessful. A function may be added to send a message that prompts the registrant of the content to deregister the content from the server 30 when the content has proved invalid.

The unit that verifies certificates 42 receives a certificate revocation list (CRL) from the certificate authority 70 periodically or when required and stores this list into the certificate revocation list database 43 for management. Having received the public key certificate 3123 from the unit that acquires signatures 41, the unit that verifies certificates 42 first checks whether the public key certificate is expired and annulled. Then, referring to the certificate revocation list database 43, the unit that verifies certificates 42 checks whether the public key certificate 3123 is revoked. When the public key certificate 3123 has proved valid, the unit that verifies certificates 42 passes the public key existing within the public key certificate 3123 to the unit that acquires signatures 41 as the result of processing. If the public key certificate is invalid, the unit that acquires signatures 41 is notified of verification unsuccessful.

Having received the signature 312 and the public key from the unit that acquires signatures 41, the unit that verifies signatures 44 verifies the signature 312. It passes the content ID 3125 from the signature 32 to a unit that manages registration information 46A where the registration database is searched for the status of registration of the content. As the result of search, if the status of the content registration is valid, the unit that acquires signatures 41 is notified of result "valid." If the status is invalid or void, the unit that acquires signatures 41 is notified of result "invalid."

The registration database 45A is a table-form database wherein a content ID 3125 entry is used as a search key and this database is used for content registration status management. The content registration status indicates that the status of a content item is "valid" (that is, the content should be sent to the client 10 as a response) or "void" (that is, the content should not be sent to the client 10 as a response). The status of a content item is set "valid" when the content has been registered on the content registration server 50 and it is within its expiry date. The status of a content item is set "void" when the registrant's application for deregistering the content has been issued to the content registration server 50 and the content deregistered, though the content has previously been registered on the content registration server 50 and it is within its expiry date. When a content item is expired or an application for registering the content is not issued to the content registration server 50 (not registered in the registration database 45A), it is made "invalid."

Difference between "void" and "invalid" may be reflected in logs output from the signature verification server 40 and the proxy server 20 and a response message sent back to the client 10 or a messages mailed to the registrant of the content.

An example of registration database 45A structure is illustrated in FIG. 5.

In the content ID field 451, a content ID 3125 uniquely assigned to a registered content item within the system is stored. In the status field 452, the status of registration of the content which has been described above is stored. In the expiry date field 453, the expiry date of the registered content is stored. A content item whose expiry date passed is made invalid and the registrant of the content has to perform its re-registration (renewal) to make it return to service.

In the URL field 454, an URL where the registered content is located on the network is stored. In the registrant information field 455, the person information as to the registrant of the content, such as, address, name, and e-mail address, is stored. In the field of when it was invalided 456, the date when the content was deregistered by the registrant's application for deregistering the content issued to the content registration server 50 is stored. In the security level field 457, a security level associated with the content is stored, which is used for processing by the content verification server 60 and will be described later.

The unit that manages registration information 46A in FIG. 4 searches the registration database 45A and updates the database. Having received a search request for a content ID 3125 from the unit that verifies signatures 44, the unit that manages registration information 46A searches the registration database 45A for the content ID 3125, judges the registration status of a content ID 3125 from the information stored in the status field 452 of the content, and notifies the unit that verifies signatures 44 of result "valid," "void", or "invalid." Having received an update request (for registration or deletion) from the content registration server 50, the unit that manages registration information 46A updates the contents of the registration database 45A, according the request. In possible embodiment, the registration database 45A is not stored within the signature verification server 40; instead, another server manages an integrated database of registration, wherein the signature verification server 40 sends a content ID 3125 and a search request for registration information to that server over the network.

Figure 6:
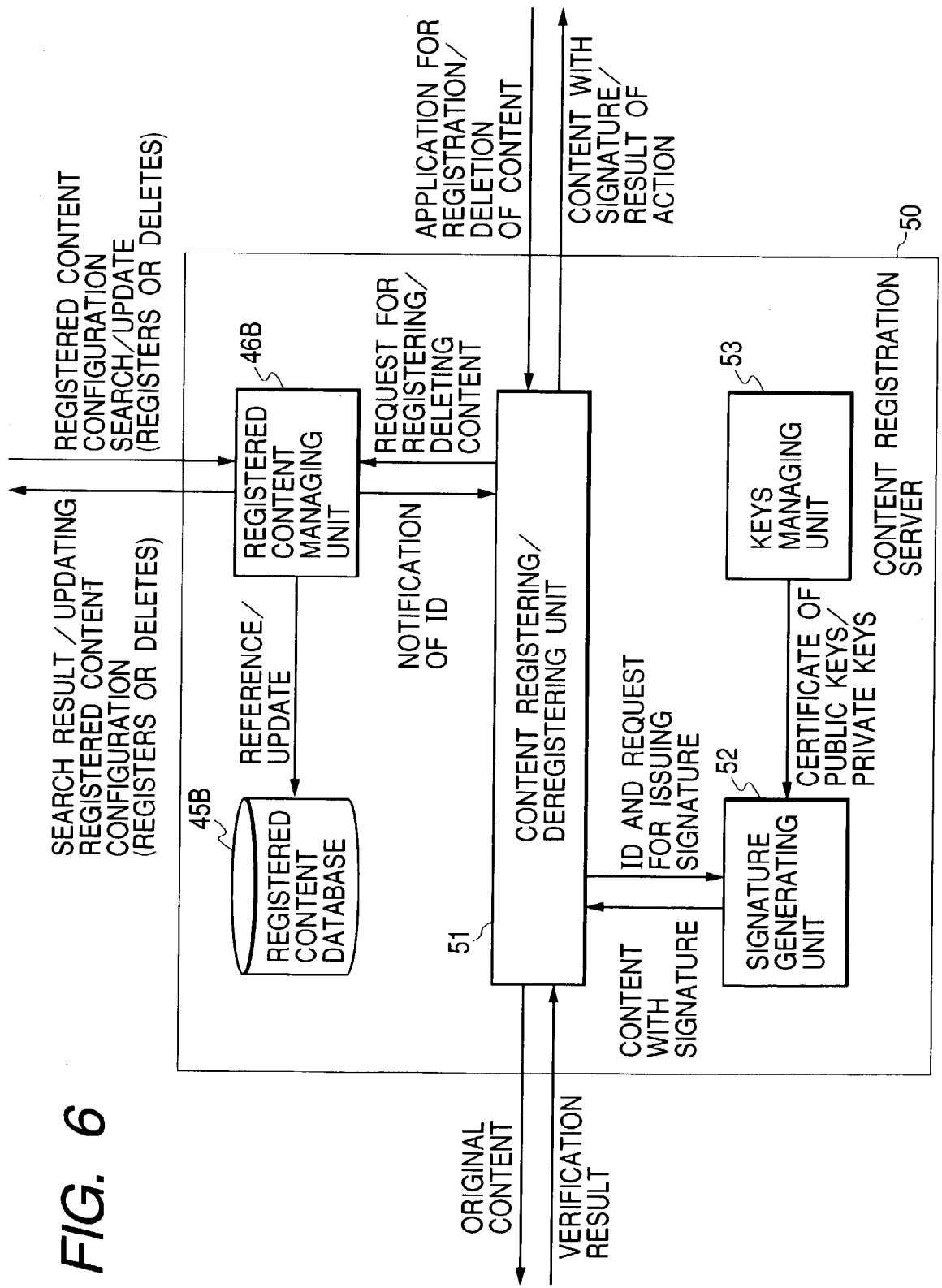
FIG. 6 is a diagram representing a functional configuration of a content registration server 50.

FIG. 6 shows a configuration example of the content registration server 50.

When the content registering/deregistering unit 51 receives an access request from the content registrant terminal 80, it sends back an entry form window interface which is used for the registrant to enter necessary information, and accepts an application for registering or deregistering (deleting) content. Then, the content registering/deregistering unit 51 receives necessary information such as registrant information and original content 311 from the content registrant terminal 80. When having accepted the application for registering the content, the content registering/deregistering unit 51 sends the original content 311 to be registered with a request for verifying the content data to the content verification server 60. If the result of verification has no problem, the content registering/deregistering unit 51 requests the unit that manages registration information 46B to register the content and gets content ID 3125. Then, the content registering/deregistering unit 51 passes the original content 311 and the obtained content ID 3125 to a unit that generates signatures 52. After getting signed content 31 from the unit that generates signatures 52, the content registering/deregistering unit 51 sends back the result of action and the signed content 31 to the content registrant terminal 80. When having accepted the registrants application for deregistering content, the content registering/deregistering unit 51 prompts the registrant to enter the content ID 3125 or URL from the content registrant terminal 80. Using the registrant-specified content ID 3125 or URL as the search key, the content entry is searched out from the database and deleted.

Having received content ID 3125, the unit that generates signatures 52 creates signed content 31 illustrated in FIG. 9. At this time, the unit that generates signatures 52 gets the relevant private key and public key certificates required for generating a signature 312 to the content from a unit that manages keys 53 where such key certificates are stored securely.

The unit that manages registration information 46B is essentially the same as the unit that manages registration information 46A shown in FIG. 4. When the unit that manages registration information 46B receives a request for registering content, its additional function is to create a new entry in the registration database 45B and assign a content ID 3125 that is not in use to the content. When the unit that manages registration information 46B receives a content ID 3125 or URL and a request for deleting content, it searches the registration database 45B for a content entry matching with the search key that is the received content ID 3125 or URL and deletes the matched content entry.

Moreover, the unit that manages registration information 46B has the following function. When a content item is registered or deregistered, this unit instructs other content registration servers 50 and signature verification servers 40 to register or delete the same content into/from their registration databases 45, using communication over the network.

This function makes it possible to assure consistency of the contents of all the databases. The registration database 45B is the same as the registration database 45A illustrated in FIG. 5.

Figure 7:
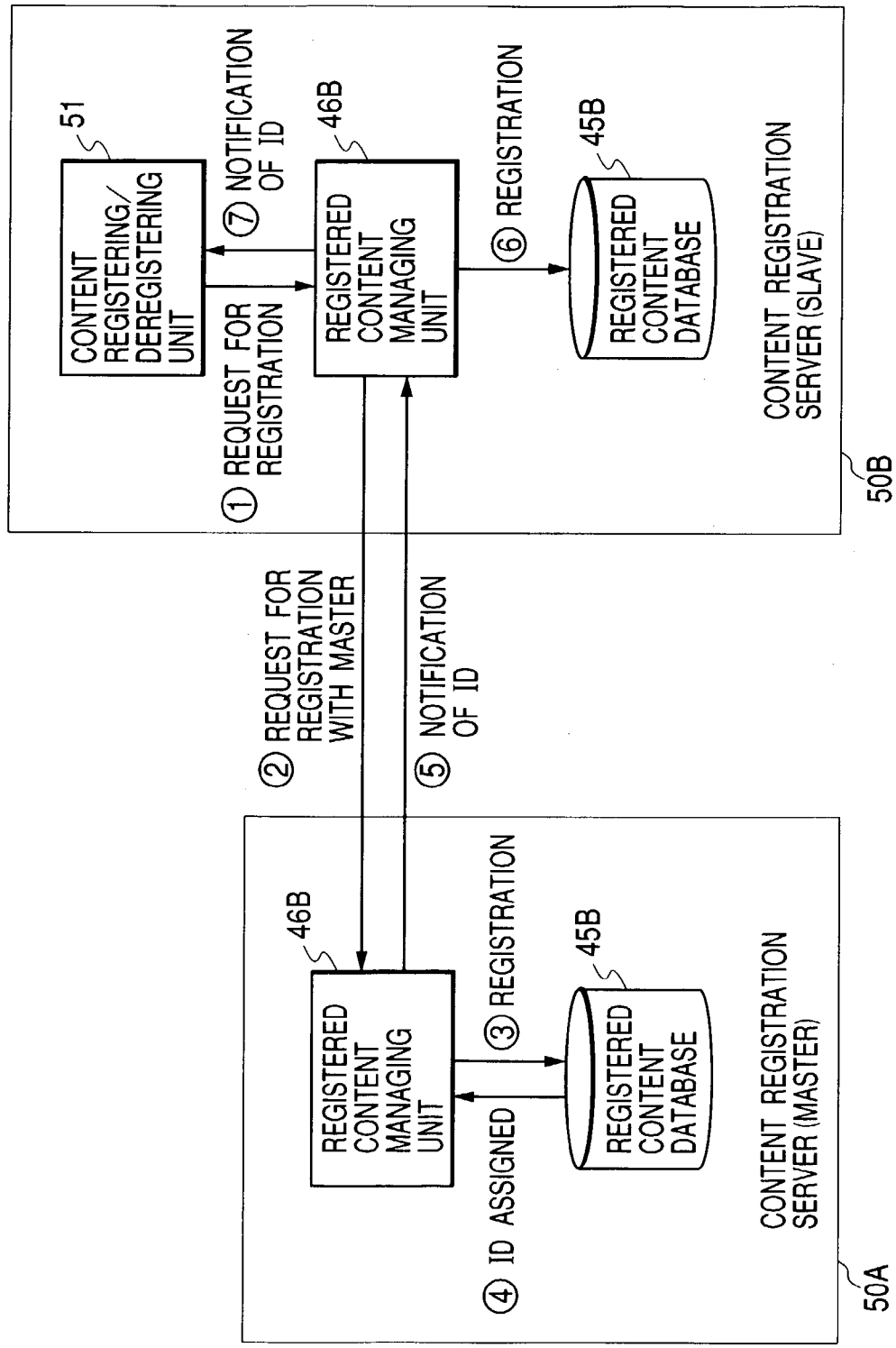
FIG. 7 illustrates an example of synchronizing registration databases 45.

FIG. 7 illustrates an example of a method of synchronizing the registration databases 45 respectively used by remote units that manage registration information 46 over the network. In a case where a plurality of content registration servers 50 are provided, synchronizing a plurality of registration databases 45 is important. In order to avoid inconsistent contents of the databases and content ID 3125 duplication, registration databases 45 are prepared so that latest information is always stored therein and one content registration server 50A is positioned as the master. When another content registration server 50B (slave) receives an application for registering content, its content registering/deregistering unit 51 passes the request for registering content to the unit that manages registration information 46B. Through communication over the network, the request for registering content is then transferred to the content registration server master 50A and a content ID 3125 is assigned to the content. Using this content ID 3125, the registration databases 45B are updated and a signature 312 is generated. Thus, the content ID 3125 can be shared between the content registration servers 50 and its duplication can be avoided.

Figure 8:
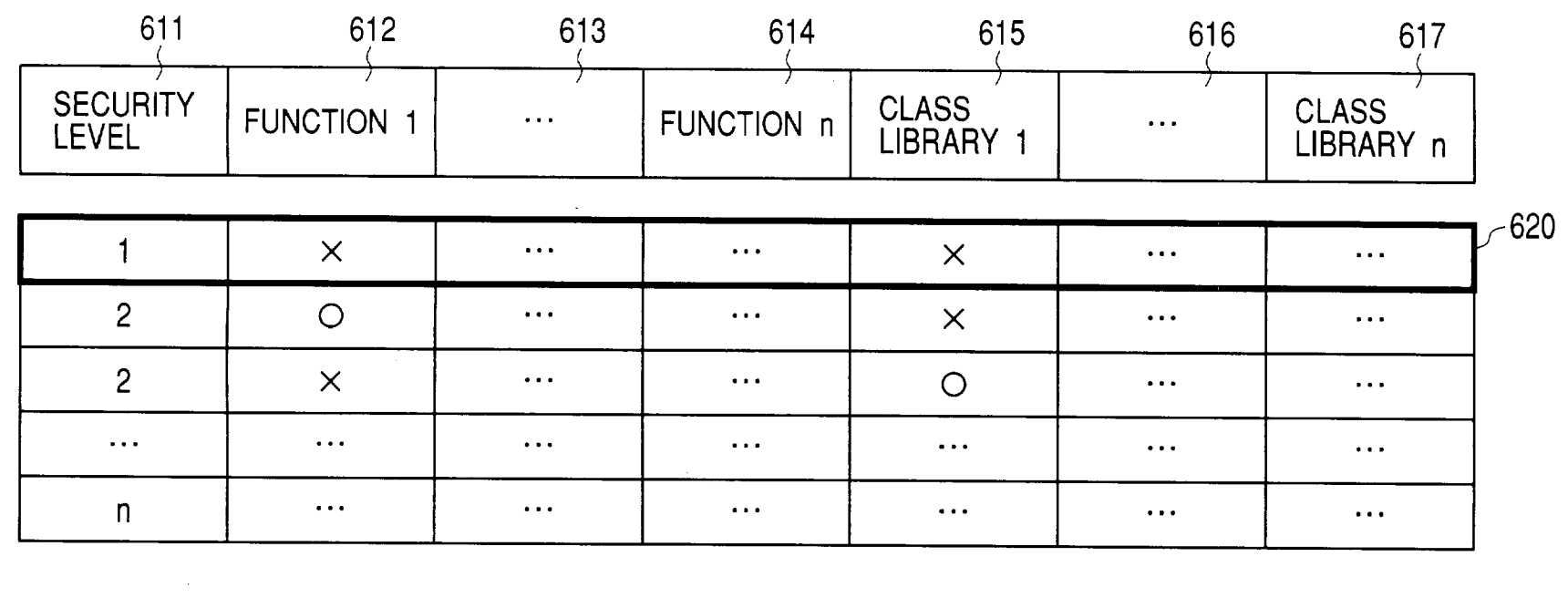

FIG. 8 illustrates an example of a table-form database provided in the content verification server 60, which is used for verifying the contents of a computer-executable program file.

This database is used to determine a security level, according to functions to be used in a computer-executable program file and class libraries incorporated in the program. Per entry row 620, the table has a security level field 611 to contain a value indicating a program security level, function designation fields 612 through 614, and class library designation fields 615 through 617. The table example of FIG. 8 gives information that a program using function 1 and a program in which class library 1 is incorporated have security level 2.

The security level that the content verification server 60 determined by referring to the above database when verifying content is compared with the security level specified by the registrant of the content and contained in the security level field 457 in the registration database 45 illustrated in FIG. 5. By this comparison, content distribution can be restricted by a security level, according to the contract made between the operator of the present system and the content registrant. For example, the following arrangements can be made: content registrant A who pays a rather high contract rate to the operator of the system is allowed to distribute programs of a lower security level, whereas content registrant B who pays a rather low contract rate to the operator can distribute only programs of high security level.

Figure 10:
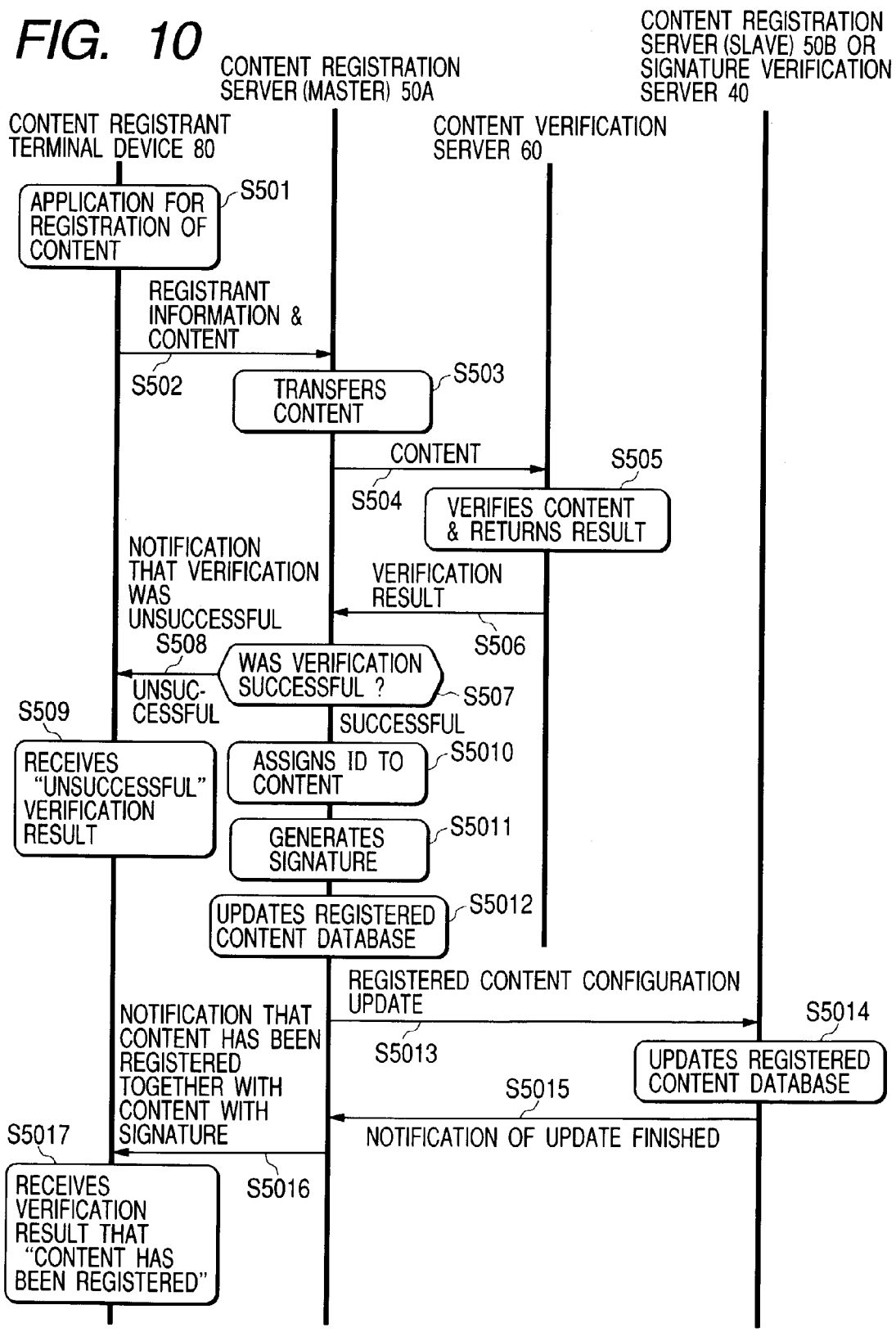
FIG. 10 illustrates a process flow example of a content registration procedure in the network system.

FIG. 10 illustrates a process flow example of a content registration procedure starting with the registrant's application for registering content, primarily carried out by the content registration server, master 50A.

First, the registrant of content enters necessary information including registrant information 455, using a Web browser, at the content registrant terminal 80 (S501). The necessary information and original content 311 are sent to the content registration server, master 50A (S502). The content registering/deregistering unit 51 receives necessary information including the registrant information 455 and the content 311 from the content registrant terminal 80 and sends the content 311 to the content verification server 60 (S503, S504). The content verification server 60 verifies the content (S505) and returns the result of verification (S506).

The content registration server, master 50A checks the content verification result returned (S507). If there is no problem (for example, the program does not include viruses, or the program does not use functions of low security), the unit that manages registration information 46B assigns an content ID 3125 that is not in use to the content (S510). Then, the unit that generates signatures 52 generates a signature 312 (S511). Then, a new content entry 459 is added to the registration database 45B (S512). Furthermore, the unit that manages registration information 46B instructs the signature verification server 40 and another content registration server 50 to update the registration databases (register the content into the databases) (S513 through S515). Finally, the content registering/deregistering unit 51 sends a notification of result "registration procedure complete" together with the signed content 31 to the content registrant terminal 80 (S516, S517).

If a problem is detected in the verification result in step S507, the content registering/deregistering unit 51 sends a notification of result "unsuccessful content verification" to the content registrant terminal 80 (S508, S509).

Figure 11:
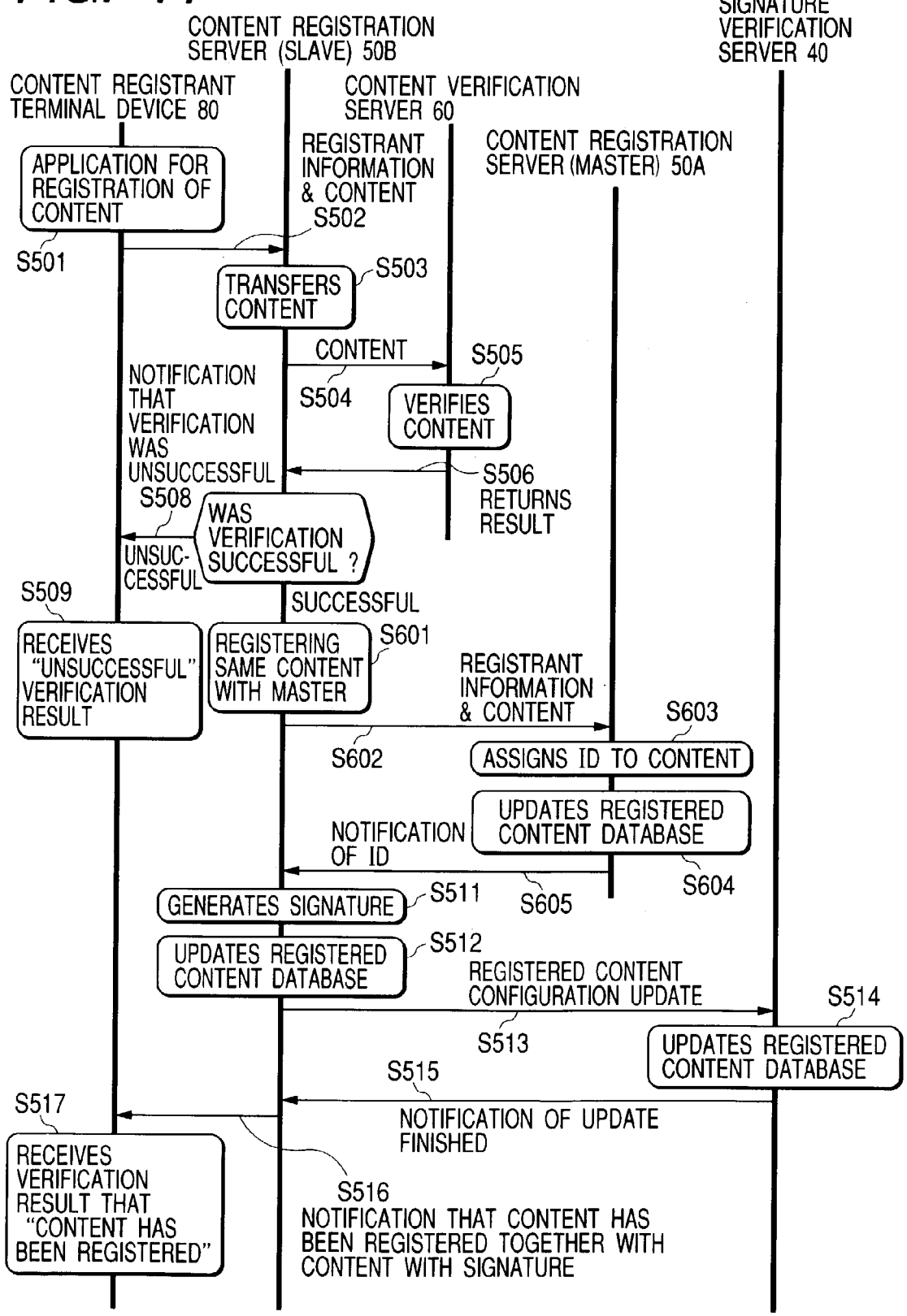
FIG. 11 illustrates another process flow example of a content registration procedure in the network system.

FIG. 11 illustrates a process flow example of a content registration procedure starting with the registrant's application for registering content, primarily carried out by a slave content registration server 50B.

The S501 through S509 are the same as the corresponding ones of FIG. 10. Following S507, registering the content with the content registration server, master 50A is performed (S601). The content registration server, slave 50B sends the registrant information 455 and the content 31 to the content registration server, master 50A (S602). The master server 50A assigns a content ID 3125 to the content (S603), updates the registration database 45B (S604), and transfers the content ID 3125 to the content registration server, slave 50B (S605). S605 and subsequent steps are the same as S511 through S517 of FIG. 10.

Figure 12:
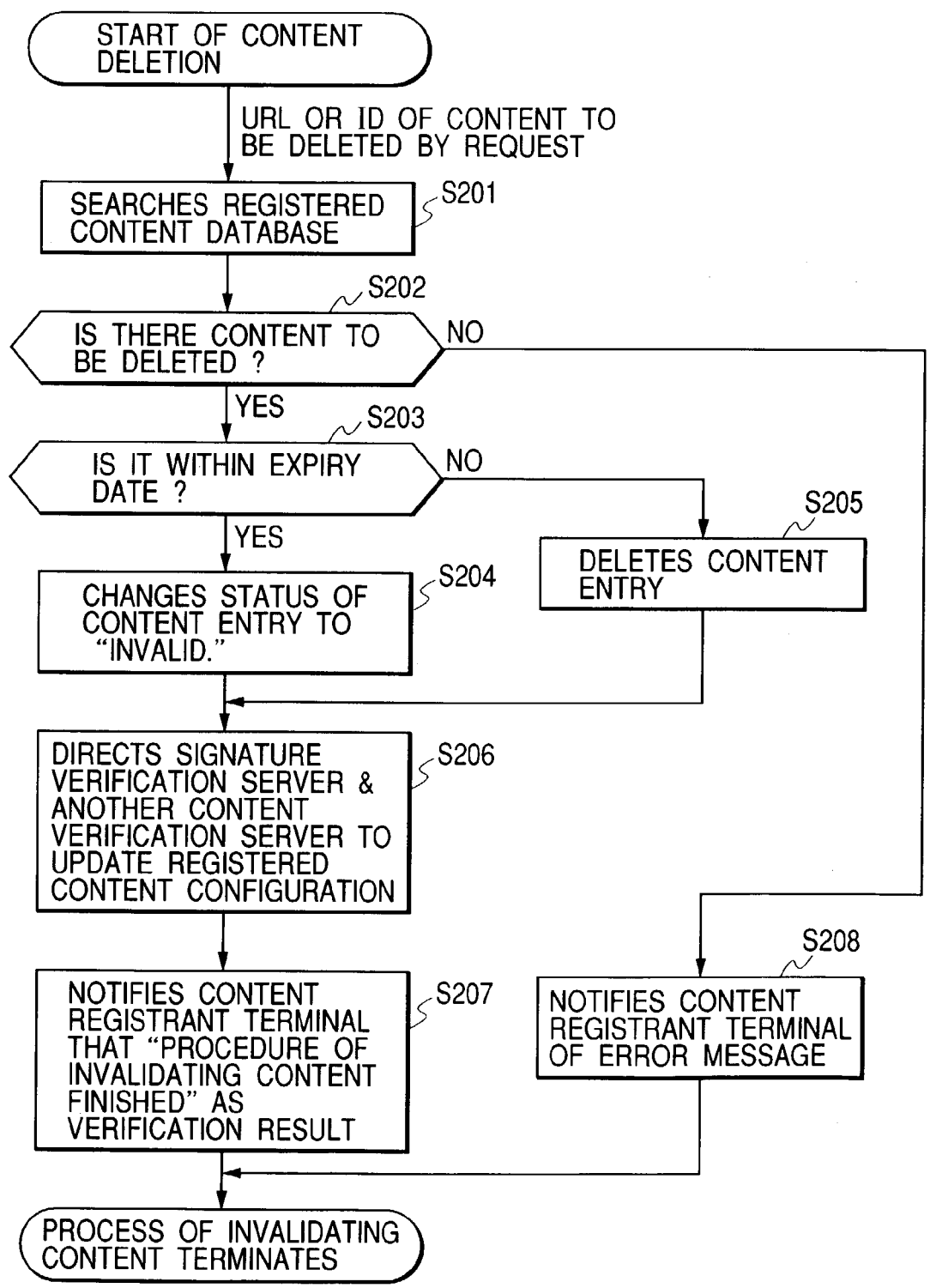
FIG. 12 illustrates a process flow example of a content deregistration procedure in the network system.

FIG. 12 illustrates a process flow example of a content deregistration procedure starting with the registrant's application for deregistering content, carried out by the content registration server 50.

First, the content registering/deregistering unit 51 receives the URL or content ID 3125 of a content item to be deregistered (deleted) by the registrant's application from the content registrant terminal 80 and the unit that manages registration information 46B searches the registration database 45B for the content (S201). It is checked whether there is the content to be deleted (S202). If it is found, its expiry date field is checked and whether it is within the expiry date is checked (S203). If it is within the expiry date, the status 452 is changed to "void" (S204). If it is beyond the expiry date, the entry row itself is deleted (S205). Then, the unit that manages registration information 46B directs the signature verification servers 40 and other content registration servers 50 to update their registration databases (delete the content from the databases) (S206). Finally, the content registering/deregistering unit 51 sends a notification of result "deregistration procedure complete" to the content registrant terminal 80 (S207). If the content to be deleted is not found instep S202, the content registering/deregistering unit 51 notifies the content registrant terminal 80 of an error message (S208).

Then, a process flow example of expiry date check in the registration database 45, which should be performed periodically on the master content registration server 50, will be explained.

First, the unit that manages registration information 46 refers to the entries 459 in the registration database 45 and checks whether there is an unreferenced entry. If it is found, whether it is beyond the expiry date is checked by referring to the expiry date field 453. If it is beyond the expiry date, the entry row is deleted. If it is within the expiry date, the entry row is not deleted. The above action is repeated for other entries 459, if exist. If unreferenced entries no longer exist, the unit that manages registration information 46B directs the signature verification servers 40 and other content registration servers 50 to update their registration databases by making the same deletion.

Figure 13:
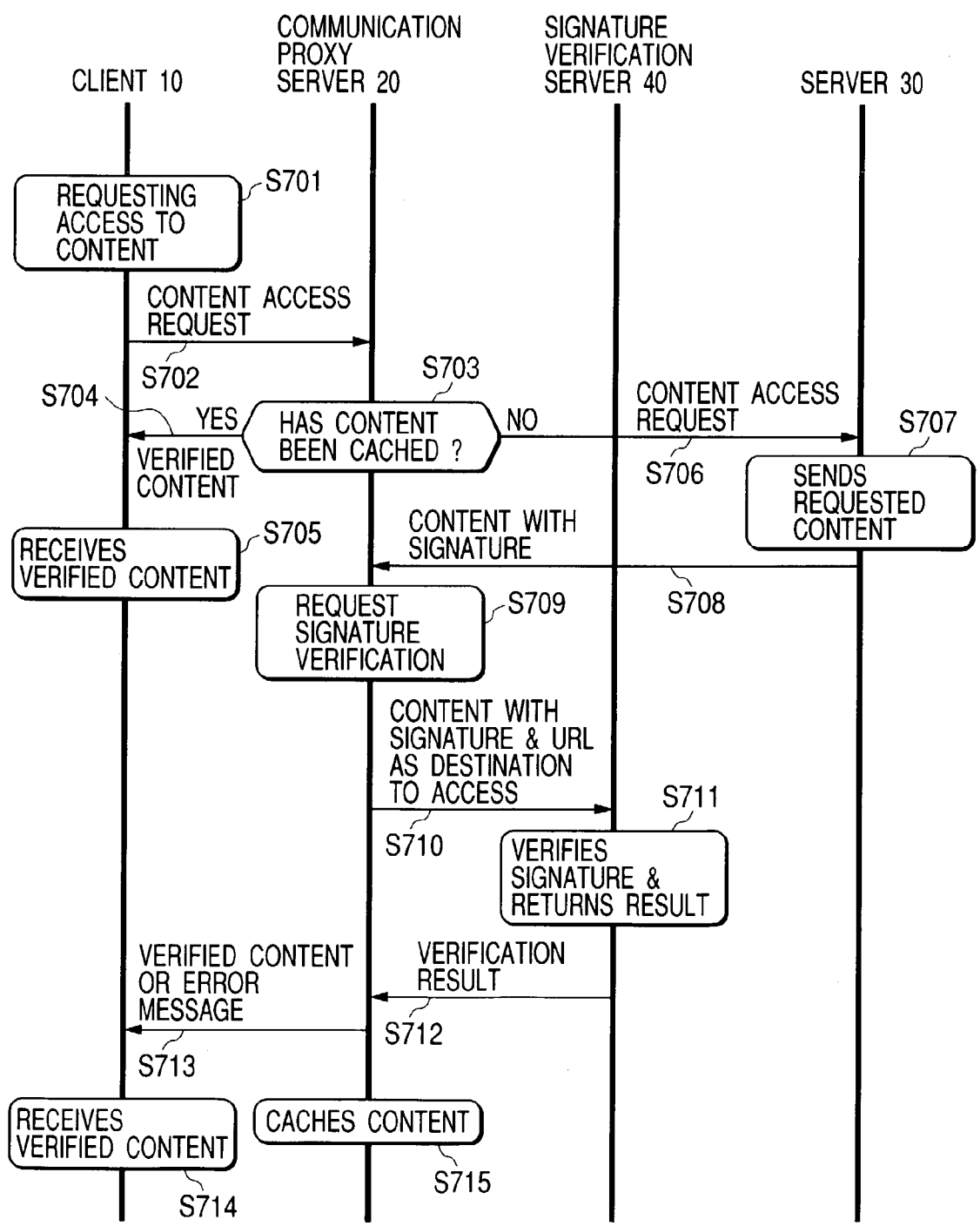
FIG. 13 illustrates a process flow example of downloading content in the network system.

FIG. 13 illustrates a process flow example of handling a request for access to signed content 31 issued from the client 10.

First, the client 10 sends an access request to the proxy server 20 (S701, S702). The proxy server 20 checks whether the content to be accessed has been cached on it (S703). If it has been cached, the proxy server sends the cached content to the client (S704, S705). If not, the proxy server forwards the access request to the server 30 (S706).

After the server 30 sends back signed content 31 to the proxy server 20 (S707, S708), the proxy server 20 forwards the content 31 to the signature verification server 40 (S709, S710). The signature verification server 40 verifies the signature as additional processing and returns the result (S711, S712). At this time, together with the result, the verified original content 311, signed content 31, or an error message may be sent to the proxy server 20.

Then, the proxy server 20 sends the verified original content 311, signed content 31, or the error message to the client 10 (S713, S714) and caches the original content or signed content 31 if cache space is available for the content (S715).

If signed content 31 is sent to the proxy server in steps S711, S712, the proxy server 20 may remove the signature 312 from the signed content 31 in step S713 and send the original content 311 to the client 10. If the URL of another content is specified in the original content 311 verified by the signature verification server 40, the proxy server may request the server to access the URL and retrieve the content and send the content received from the server to the client 10.

In possible embodiment, when registering content by the registrant's application, the content registration server 50 may instruct the unit that relays communication data 21 of the proxy server 20 to cache the verified content. The advantage hereof is quick response to access request because the content registered by the content registration server 50 is immediately cached on the proxy server 20. When access to the content is requested from the client 10, the cached content is always sent back to the client unless the content is uncached.

Figure 15:
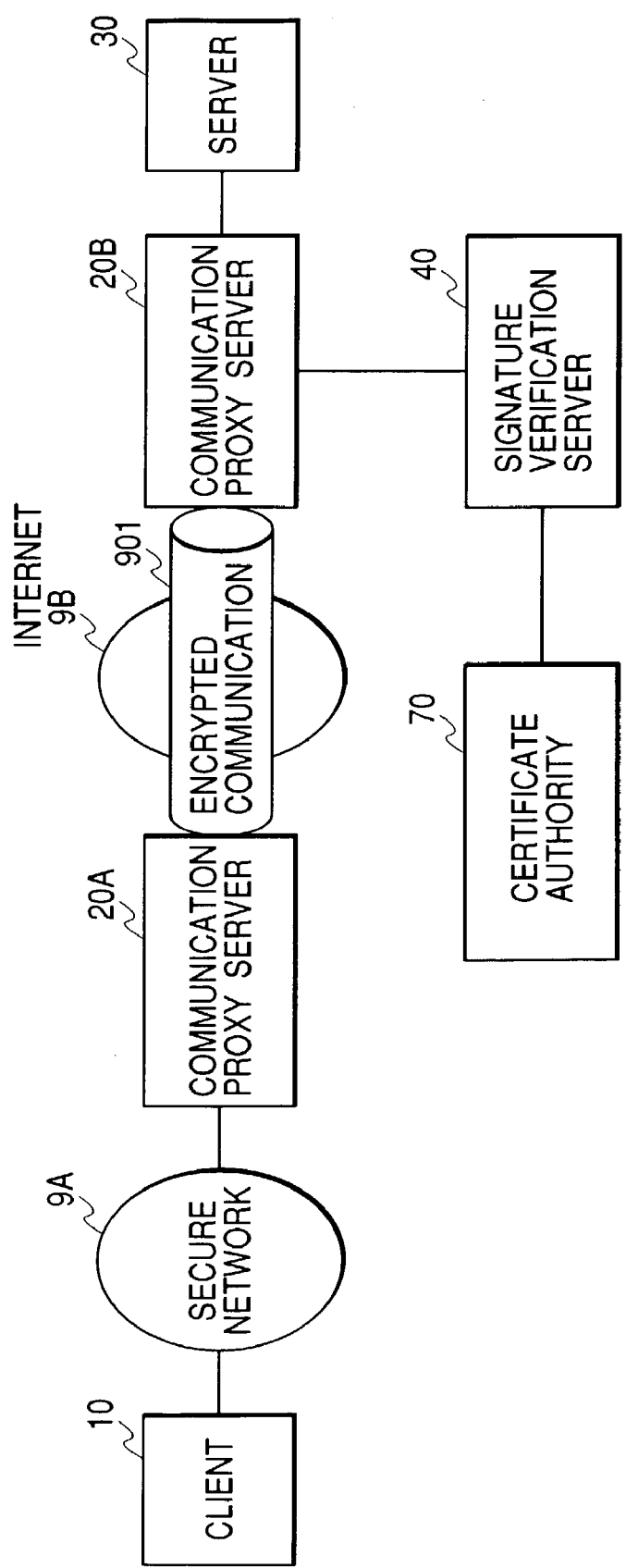
FIG. 15 shows an example of forming the network system according to another preferred embodiment of the invention.

In a second preferred embodiment of the invention, which is shown in FIG. 15, a plurality of proxy servers 20 are provided and an encrypted communication channel 901 is established between two proxy servers 20A and 20B. Clients 10 can connect to a proxy server at near location.

In the second preferred embodiment, one proxy server 20A with the caching advantage that enables quick response to a client 10, another proxy server B that is nearer to the server 30, and the signature verification server 40 are operated separately; consequently, the distributed functions enable load sharing in the system. It is also possible that different operators run respective proxy servers which have different functions; for example, a communication carrier provides and maintains the proxy server 20A and a corporation or a content provider provides and maintains the proxy server 20B.

Next, a third preferred embodiment of the invention will be described which is illustrated by another example of process flow of downloading content, using the invented network system and content verification method. Downloading content through the network to a PC or cellular mobile phone is performed in the following sequence.

Before downloading content itself, download a file called metadata in which supplementary information such as the URL where the content is located is described. Then, parse the information described in the metadata, download the content itself, based on the thus obtained information, and execute the content.

In the third preferred embodiment, the signature 312 of the content is appended to the metadata. The metadata includes its signature 312 and the signature 312 of the content that is coupled with the metadata. The signature verification server 40 stores the signature 312 of the content when the metadata is downloaded and verifies the content which is downloaded later, using the stored signature 312.

Linking metadata with the URL of a content item is performed when the content registration server 50 registers the content item. The signature verification server 40 receives this linking information from the content registration server 50 and manages the linking information in a table. Using this linking table, the signature verification server 40 also manages locations where the metadata signature 312 attached to the metadata and the content signature 312 are stored. When having received metadata or content having a URL not registered in this table, the signature verification server 40 handles it as an illegal access error. Furthermore, it is preferable to set expiry dates for the signatures 312 of content items to be stored on the signature verification server 40 beforehand; this can prevent unnecessary consumption of the memory resources of the server.

Figure 16:
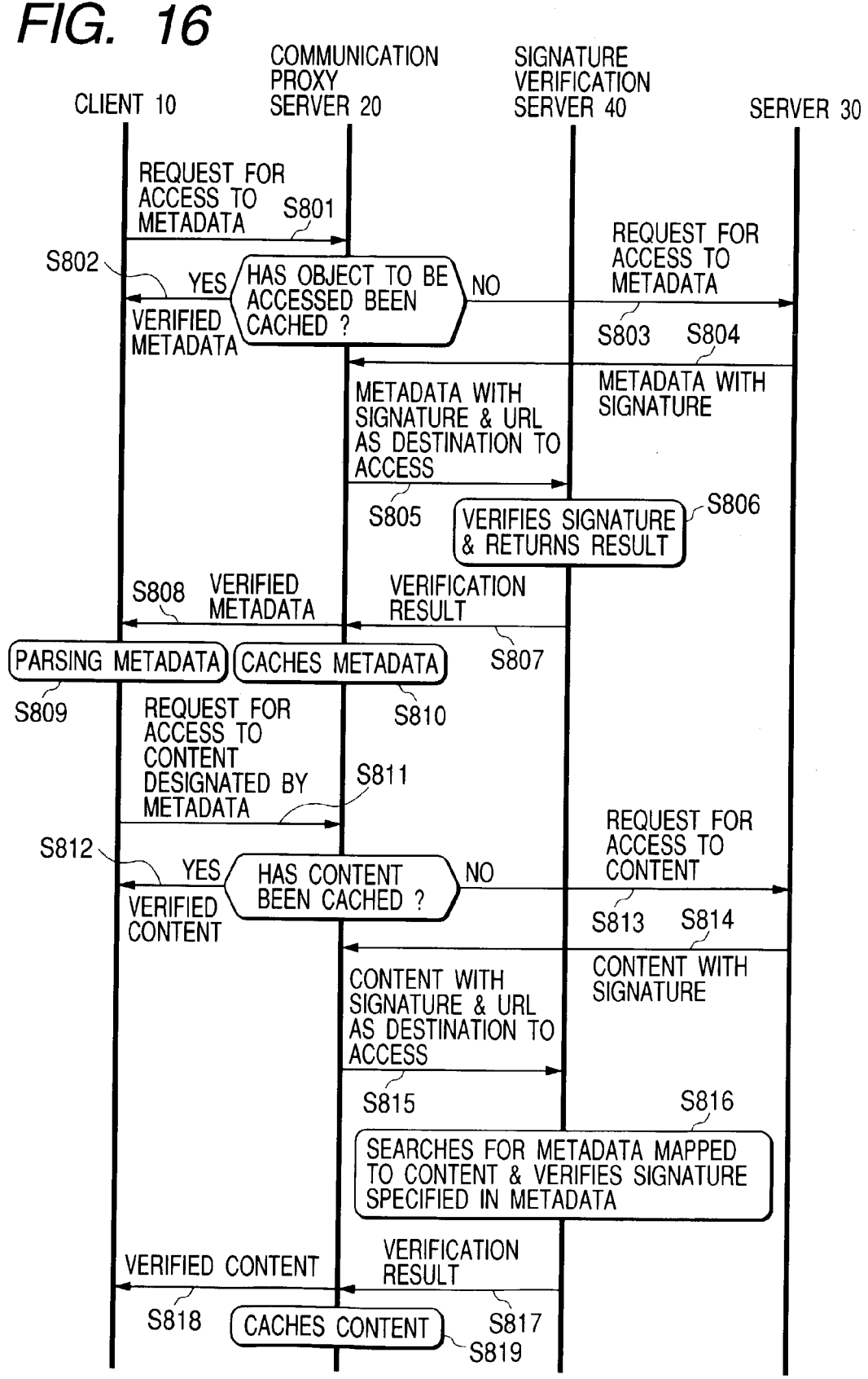
FIG. 16 illustrates a process flow in a content verification method according to a further preferred embodiment of the invention.

Using FIG. 16, the third embodiment will be explained fully. When the client 10 sends a request for access to metadata to the proxy server 50 (S801), the proxy server 50 checks whether the metadata object to be accessed has been cached on it. If it has been cached, the proxy server sends the cached metadata to the client 10 (S802). If not, the proxy server forwards the access request to the server 30 (S803).

After the server 30 sends back signed metadata to the proxy server 20 (S804), the proxy server 20 forwards the metadata to the signature verification server 40 (S805). The signature verification server 40 verifies the metadata signature 312, stores both the metadata signature 312 and content signature 312 included in the metadata, registers their locations into the linking table (S806), and returns the result (S807). Then, the proxy server 20 sends the verified metadata or an error message to the client (S808) and caches the metadata if cache space is available for the metadata (S810).

The client 10 parses the received metadata (S809) and sends a request for access to the content designated in the metadata to the proxy server 20 (S811). The proxy server 20 checks the content (whose signature 312 has been verified) to be accessed has been cached on it. If it has been cached, the proxy server sends the cached content to the client 10 (S812). If not, the proxy server forwards the access request to the server 30 (S813). After the server 30 sends back the content to the proxy server 20 (S814), the proxy server forwards a message 32 comprising the content and the URL as the destination to access 321 to the signature verification server 40 (S815).

The signature verification server 40 searches the linking table for an object matching with the URL of the content as the search key and searches for the signature 312 of the content stored when the metadata was downloaded before and managed under the entry of the metadata coupled with the content. If the stored signature 312 of the content is found, then, the signature verification server 40 verifies the content (S816) and returns the result. If not, the signature verification server 40 returns an error (S817). Then, the proxy server 20 sends the verified content or an error message to the client 10 (S818) and caches the content if cache space is available for the content (S819).

If a plurality of signature verification servers 40 are provided in this embodiment, content must be verified by a signature verification server 40 that verified the metadata coupled with it. For this reason, the proxy server 20 manipulates data so that content is surely forwarded to the specified signature verification server 40. Specifically, the content's URL described in the metadata sent back to the proxy server 20 in step S807 or the status information of the HTTP session stored in the HTTP header used when transmitting content and metadata (for example, a cookie header) is rewritten or additionally written and the ID 3125 that identifies the signature verification server 40 that is to verify the content is added.

For example, content's URL "http://server A/metadata" should be written to "http://server A/metadata?signature verification server=01." Because the client sends a request for access to content with the rewritten URL in step S811, the proxy server 20 parses the additional portion of the URL "signature verification server=01" following the question mark "?" and forwards the content to the specified signature verification server 40 during the process of downloading the content.

For cookie, for example, header "Set-Cookie2: signature verification server=01" should be appended to the HTTP message to be exchanged between the proxy server 20 and the signature verification server 40. When the proxy server 20 receives a request with the cookie header "Cookie: signature verification server=01" from the client 10, it parses the cookie header and can forward the content to the specified signature verification server 40 as is the case for the URL example. Because the proxy server 20 has the information stored as to the signature verification server 40 to which the metadata was forwarded, the proxy server 20 may describe the cookie header and append it to the metadata which is sent back to the client 10.

The third preferred embodiment have the following two advantages:

First, it can be verified whether content is downloaded in conjunction with its proper metadata. Content's URL is described in the metadata and the client 10 requests access to the content after parsing the metadata. However, verifying metadata and content separately cannot detect false metadata written by a third party for accessing to content. For protection, the content signature 312 is attached to the metadata so that it can be verified that proper content and metadata coupled together are downloaded.

Second, content to be provided is not manipulated and, therefore, downloaded content, even if it is downloaded without utilizing the invented network system, can be executed on the client 10 without trouble. For example, from mobile phones, access to content and metadata must be performed through the invented network system. From PCs, however, such access is possible without the intervention of the invented network system. In the latter case, when downloading signed metadata and content, the device to which the metadata with irrelevant data (signatures 312) was downloaded normally ignores the irrelevant data without judging it as an error because the metadata is supplementary data and it is not executed. However, if the device attempts to execute signed content, there is a possible of an error due to the data irrelevant to the content (that is, the signature 312) attached to the content. By including content's signature in metadata as in this embodiment, this kind of errors on the client 10 can be avoided.

The specification and drawings are, accordingly, to be regarded in an illustrative rather than a restrictive sense. It will, however, be evident that various modifications and changes may be made thereto without departing from the spirit and scope of the invention as set forth in claims.

What is claimed is:

1. A network system comprising:
   a client which sends an access request to a server;
   the server which receives the access request from the client and distributes content;
   application servers, each of which performs, upon reception of content, additional processing of the content and returns processed content and data to a unit that sent the content to it;
   a proxy server which relays data to be communicated between the client and the server, said proxy server comprising:
   a unit that relays communication data which receives the access request from the client and forwards it to the server and receives the content from the server,
   a unit that calls out application server which receives content from the unit that relays communication data, encapsulates the content into a predetermined format message, forwards the message to one of the application servers, and receives the content and result of additional processing performed by the application server,
   wherein the unit that relays communication data sends data based on the result to the client,
   wherein the unit that relays communication data caches the content sent back from the server, and, when having received a request for access to the cached content from the client, sends back the cached content to the client if it is within its expiry date which has been indicated by the metadata of the content or set on the proxy server beforehand, and
   wherein the unit that relays communication data caches the processed content received from one of the application servers or content retrieved via the network, according to information indicating a processed content location on the network;
   a content registration server which accepts content from a content manager;
   a content registrant terminal on which a program runs to provide an interface for registering content with the content registration server;
   a content verification server which receives content from the content registration server and checks the content data by a predetermined method;
   wherein the content registration server creates signed content by attaching a signature to content received from the content registrant terminal if the content verification server has verified that the content satisfies predetermined conditions;
   wherein one of the application servers is a signature verification server which verifies the signature of the signed content, said signature verification server comprising:

a unit that acquires signatures which takes out a signature from signed content that is unverified received from the proxy server, a unit that verifies certificates which verifies the validity of a public key certificate to be used for verifying the signature;

a certificate revocation list database for management of a certificate revocation list to be used for verifying the validity of a public key certificate, a unit that verifies signatures for verifying signatures;

a registration database for storing registration information per content ID included in a signature, and a unit that manages registration information for managing the registration information per content ID;

the server stores the signed content created by the content registration server;

the proxy server forwards the signed content received from the server to the signature verification server and determines whether the signed content should be sent to the client, according to the result of verification returned; and wherein the signature verification server communicates with the content registration server so that the registration database is synchronized with the same database on the content registration server.

2. A network system comprising:

a client which sends an access request to a server;

the server which receives the access request from the client and distributes content;

application servers, each of which performs, upon reception of content, additional processing of the content and returns processed content and data to a unit that sent the content to it;

a proxy server which relays data to be communicated between the client and the server, said proxy server comprising:

a unit that relays communication data which receives the access request from the client and forwards it to the server and receives the content from the server, a unit that calls out application server which receives content from the unit that relays communication data, encapsulates the content into a predetermined format message, forwards the message to one of the application servers, and receives the content and result of additional processing performed by the application server, wherein the unit that relays communication data sends data based on the result to the client, wherein the unit that relays communication data caches the content sent back from the server, and, when having received a request for access to the cached content from the client, sends back the cached content to the client if it is within its expiry date which has been indicated by the metadata of the content or set on the proxy server beforehand, and wherein the unit that relays communication data caches the processed content received from one of the application servers or content retrieved via the network, according to information indicating a processed content location on the network;

a content registration server which accepts content from a content manager;

a content registrant terminal on which a program runs to provide an interface for registering content with the content registration server;

a content verification server which receives content from the content registration server and checks the content data by a predetermined method;

wherein the content registration server creates signed content by attaching a signature to content received from the content registrant terminal if the content verification server has verified that the content satisfies predetermined conditions;

wherein one of the application servers is a signature verification server which verifies the signature of the signed content;

the server stores the signed content created by the content registration server;

the proxy server forwards the signed content received from the server to the signature verification server and determines whether the signed content should be sent to the client, according to the result of verification returned;

wherein a signature to a second content item is included in a first content item;

when verifying the first content item, the signature verification server stores the signature of the second content item included in the first content item; and when verifying the second content item, the signature verification server performs verification, using the stored signature of the second content item.

* * * * *